United States Patent
Schrödinger

(10) Patent No.: US 6,583,737 B2
(45) Date of Patent: Jun. 24, 2003

(54) DEVICE AND METHOD FOR COMPENSATING FOR PROPAGATION DELAY

(75) Inventor: Karl Schrödinger, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/090,324

(22) Filed: Mar. 4, 2002

(65) Prior Publication Data
US 2002/0093702 A1 Jul. 18, 2002

Related U.S. Application Data

(63) Continuation of application No. PCT/DE00/03097, filed on Sep. 4, 2000.

(30) Foreign Application Priority Data

Sep. 3, 1999 (DE) .......................... 199 43 739

(51) Int. Cl.$^7$ ................................ H03M 9/00
(52) U.S. Cl. ........................ 341/100; 341/101
(58) Field of Search ................ 341/100, 101, 341/118, 120

(56) References Cited

U.S. PATENT DOCUMENTS

| | | | |
|---|---|---|---|
| 4,099,347 A | | 7/1978 | Sharp .................... 16/221 |
| 4,759,018 A | * | 7/1988 | Buchner ................ 370/535 |
| 4,818,995 A | | 4/1989 | Takahashi et al. ......... 341/94 |
| 5,191,437 A | * | 3/1993 | Kim ..................... 386/91 |
| 5,426,644 A | | 6/1995 | Fujimoto .............. 370/535 |
| 5,872,959 A | * | 2/1999 | Nguyen et al. ......... 710/305 |
| 5,963,602 A | * | 10/1999 | Aoki et al. ............ 375/354 |
| 5,987,083 A | | 11/1999 | Matsushita et al. ..... 375/356 |

FOREIGN PATENT DOCUMENTS

| | | | |
|---|---|---|---|
| DE | 690 17 115 t2 | 10/1992 | .......... H04J/14/02 |
| DE | 195 81 595 T1 | 3/1997 | .......... G06F/1/04 |
| EP | 0 533 091 A2 | 3/1993 | .......... H04L/25/49 |
| EP | 0 593 206 A1 | 4/1994 | .......... H04J/14/08 |

OTHER PUBLICATIONS

Jeong: "Long–Distance Parallel Data Link Using WDM Transmission with Bit–Skew Compensation" Journal of Lightwave Technology, vol. 14, No. 5, May 1996, pp. 655–660.

* cited by examiner

Primary Examiner—Peguy JeanPierre
(74) Attorney, Agent, or Firm—Laurence A. Greenberg; Werner H. Stemer; Ralph E. Locher

(57) ABSTRACT

The device and method compensate for propagation differences between n serial data streams each transmitted over parallel optical lines. Data that can be transmitted via the n serial data streams are configured as m-bit words. The device has n regeneration devices in which data of the data stream can be regenerated. A data output and a clock pulse output of the regeneration devices are connected to a propagation time control device so that the regenerated data and the regenerated clock pulse can be transmitted to a data input or to a clock pulse input of the propagation time control devices. The propagation time control devices each have a demultiplexer for dividing the regenerated data as well as the regenerated clock pulses with a ratio of 1:(x·m), and each have an alignment device for distributing the divided regenerated data on x·m parallel data outputs of the propagation time control devices.

8 Claims, 3 Drawing Sheets

DEVICE AND METHOD FOR COMPENSATING FOR PROPAGATION DELAY

CROSS-REFERENCE TO RELATED APPLICATION

This application is a continuation of copending International Application PCT/DE00/03097, filed Sep. 4, 2000, which designated the United States.

BACKGROUND OF THE INVENTION

FIELD OF THE INVENTION

The invention relates to a method and a device for compensating for propagation delay differences between n serial data streams (n=2, 3, . . . ), which are each transmitted via parallel optical lines, with data which can be transmitted by means of the n serial data streams being in the form of m-bit-words (m=1, 2, . . . ).

Cables which have a number of optical lines can be used for optical transmission of information and data. The lines are in this case in the form of individual glass fibers. When data is transmitted in parallel form and optically via a number of glass fibers, which are combined to form a cable, the signals to be transmitted have different delays in the individual glass fibers. These delays are due to physical effects and relate, in particular, to propagation delay scatters owing to wavelength differences or manufacturing tolerances, which occur during the production of the glass fibers. This places a major restriction on the maximum length of the glass fibers that can be used for transmission. For example, the maximum length for transmission of data rates of 1.3 GBd is less than 100 m.

In order to avoid propagation delay differences resulting from manufacturing tolerances in the production of the glass fibers, the glass fibers that are produced are measured individually and are then selected such that only glass fibers with similar transmission characteristics are used together in one cable.

U.S. Pat. No. 5,426,644 (European patent 533 091) describes a method for parallel transmission of data, with a large number of 1 to P parallel data channels at the transmission end being in each case converted by means of a multiplexing apparatus as a serial data stream and then being transmitted to the receiver end, where the serial data is once again demultiplexed in an appropriate manner. This system has a propagation delay compensation apparatus, which synchronizes the serial data.

In the article "Long Distance Parallel Data Link Using WDM Transmission with Bit-Skew Compensation", from the Journal of Lightwave Technology, Vol. 14, No. 5, May 1996, G. Jeong, et al. describe, as an alternative to pure serial data transmission systems for long distances (>>10 km), a parallel WDM data transmission system with a propagation delay compensation apparatus. The disclosed methods for compensating for propagation delay between the parallel optical data channels have the disadvantage that it is necessary to measure the propagation delay differences between the various parallel transmission channels individually.

SUMMARY OF THE IVNENTION

It is accordingly an object of the invention to provide a device and method for compensating for propagation delay, which overcomes the above-mentioned disadvantages of the heretofore-known devices and methods of this general type and which compensates for the described propagation delay scatters, which, in particular, does not require separate propagation delay characterization of the parallel transmission channels.

With the foregoing and other objects in view there is provided, in accordance with the invention, a device for compensating for propagation delay differences between n serial data streams transmitted via parallel optical lines, wherein the data transmitted via the n serial data streams are formed as m-bit words, the device comprising:

n regeneration apparatus each having an input connected to one of the parallel optical lines, a data output and a clock output, the input receiving a data stream from the respective optical line, each the regeneration apparatus being configured to regenerate data and a clock from the respective data stream;

propagation delay control apparatus each having a data input and a clock input respectively connected to the data output and the clock output of the regeneration apparatus, the data input receiving the regenerated data and the clock input receiving the regenerated clock; and each of the propagation delay control apparatus having a demultiplexer for dividing the regenerated data and the regenerated clocks in a ratio 1:(x·m) and an alignment apparatus for distributing the divided, regenerated data between in each case x·m parallel data outputs of the propagation delay control apparatus, wherein a divided, regenerated clock that is synchronized to the divided, regenerated data is emitted at a clock output of a least one of the propagation delay control apparatus.

In other words, the objects of the invention are achieved:

in that data and a clock for the respective data stream are regenerated by means of the respective regeneration apparatus, with the data stream being transmitted via the parallel optical lines to the respective input;

in that one data output and one clock output of the regeneration apparatus are in each case connected to propagation delay control apparatus, so that the regenerated data and the regenerated clock are respectively passed to a data input and a clock input of the propagation delay control apparatus; and in that the propagation delay control apparatus each have a demultiplexer for dividing the regenerated data and the regenerated clocks in the ratio 1:(x·m) (x=1, 2, . . . ) and an alignment apparatus for distributing the divided, regenerated data between in each case x·m parallel data outputs of the propagation delay control apparatus, wherein a divided, regenerated clock which is synchronized to the divided, regenerated data can be emitted at a clock output of a least one of the propagation delay control apparatus.

It is a primary advantage of the invention that it provides the capability to compensate for the propagation delay scatters which occur during transmission by means of parallel optical lines. In comparison to known transmission paths, this allows considerably longer transmission paths to be used. This opens up novel application options for the use of optical signals for information transmission.

A further advantage is that there is no need for measurement and selection of glass fibers which have been produced and are intended to be used together in one glass fiber, since any propagation delay differences that occur can be compensated for by means of the device according to the invention.

In accordance with an added feature of the invention, the n regeneration apparatus are a clock regeneration apparatus.

In accordance with an alternative feature of the invention, one of the n regeneration apparatus is a clock regeneration apparatus, and a number n−1 of the regeneration apparatus are each formed as a phase regeneration apparatus, and the clock output of the clock regeneration apparatus is connected to a respective clock input of the n−1 phase regeneration apparatus.

In accordance with another feature of the invention, the device further comprises:

n multiplexer apparatus for converting the divided, regenerated data to a respective serial, regenerated data stream, the n multiplexer apparatus having x·m parallel data inputs respectively connected to the x·m parallel data outputs of the propagation delay control apparatus; and a synthesizer having an input connected to a respective clock input of the multiplexer apparatus and to the clock output of the at least one propagation delay control apparatus, and the synthesizer having an output connected to a respective further clock input of the multiplexer apparatus.

In accordance with an additional feature of the invention, at least one of the n multiplexer apparatus has a serial clock output for outputting a further serial clock signal matched to the serial regenerated data stream and delayed with respect to a serial clock signal generated by the synthesizer.

In accordance with a concomitant feature of the invention, decoder apparatus are provided. Each of the decoders is coupled between a respective propagation delay control apparatus and multiplexer apparatus.

That is, one expedient refinement of the invention provides that the n regeneration apparatus are each in the form of a clock regeneration apparatus, thus allowing separate clock regeneration for each of the parallel optical lines. One development of the invention provides that one of the n regeneration apparatus is in the form of a clock regeneration apparatus, and in that n−1 regeneration apparatus are each in the form of phase regeneration apparatus, wherein the clock output of the clock regeneration apparatus is connected to a respective clock input of the n−1 phase regeneration apparatus. This makes it possible to save n−1 clock regenerators, since only one phase matching process takes place in the n−1 phase regeneration apparatus, using the clock which is regenerated by means of the clock regeneration apparatus.

In a further development of the invention, n multiplexers for converting the divided, regenerated data to a respective serial, regenerated data stream are provided, as well as a synthesizer. The x·m parallel data outputs of the propagation delay control apparatus are respectively connected to x·m parallel data inputs of the n multiplexers, wherein the input of the synthesizer is connected to a respective clock input of the multiplexers and to the clock output of the at least one propagation delay control apparatus. One output of the synthesizer is connected to a respective clock input of the multiplexers. This makes it possible to convert the parallel data, whose propagation delay scatters have been compensated for, to a serial data stream for further processing.

It is expediently possible to provide for at least one of the n multiplexer apparatus to have a serial clock output, wherein a further serial clock signal can be emitted via the serial clock output, which further serial clock signal is matched to the serial regenerated data stream and is delayed with respect to a serial clock signal which can be produced by means of the synthesizer. This allows a serial clock signal to be provided, which can be used for further processing of the serial regenerated data stream.

In order to allow the data to be decoded, it is possible to provide for a decoder apparatus to in each case be coupled between the propagation delay control apparatus and the multiplexer apparatus.

With the above and other objects in view there is also provided, in accordance with the invention, a method of compensating for propagation delay differences, which comprises:

receiving data with n regeneration apparatus arriving in n serial data streams via respective parallel optical lines, wherein data transmitted via the n serial data streams are in the form of m-bit words;

regenerating the data and a clock for the data received in each of the respective n regeneration apparatus; transmitting the regenerated data and the regenerated clock to a respective propagation delay control apparatus;

dividing the regenerated data and the regenerated clock in a ratio 1:(x·m) with a respective demultiplexer; and distributing the divided regenerated data between parallel data outputs of the respective propagation delay control apparatus.

Other features which are considered as characteristic for the invention are set forth in the appended claims.

Although the invention is illustrated and described herein as embodied in a device and method for compensating for propagation delay, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
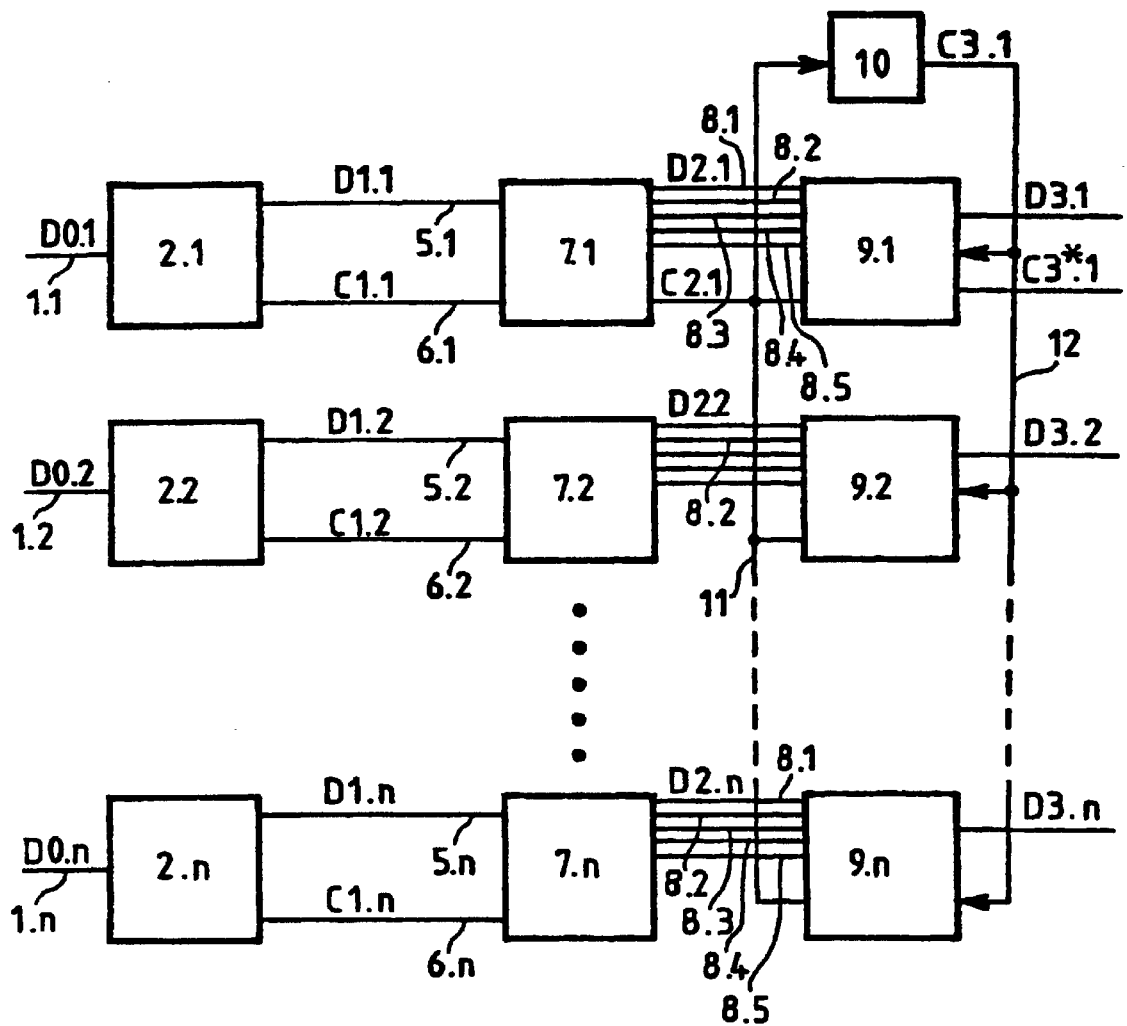
FIG. 1 is a block diagram of a device for propagation delay compensation, with separate clock regeneration apparatus.

Referring now to the figures of the drawing in detail and first, particularly, to FIG. 1 thereof, there are shown a number 1.$n$ of parallel optical lines (n=1, 2, . . . ) each connected to a clock regeneration apparatus 2.$n$. Data signals D0.$n$ are supplied via the optical lines 1.$n$ to the respective clock regeneration apparatus 2.$n$. The data signals D0.$n$ have propagation delay scatters, that is to say they are subject to different delays on the respective optical lines 1.$n$.

The data signals D0.$n$ are formed by words which do not have a specific number of bits. For the example described in the drawing, it is assumed the words to be transmitted have 5 bits. The data and the clock for the data signals D0.$n$ are regenerated in the clock regeneration apparatus 2.$n$.

Regeneration is in this case carried out within the time period of 1 bit Tbit.

It is possible, instead of the clock regeneration apparatus 2.$n$ shown in FIG. 1, to provide for only one of the parallel optical lines 1.1 to be connected to a clock regeneration apparatus 3 (see FIG. 2), and for the other parallel optical lines 1.2 . . . 1.$n$ each to be connected to a phase regeneration apparatus 4.2 . . . 4.n. In that case, n−1 clock regeneration apparatus are saved. The clock which is regenerated in the clock regeneration apparatus 3 is sufficient to regenerate the data D1.n and the clock C1.n in the phase regeneration apparatus 4.2 . . . 4.n. In this case, only a phase adjustment of ±0.5 Tbit is carried out in the phase regeneration apparatus 4.2 . . . 4.n.

Figure 3:
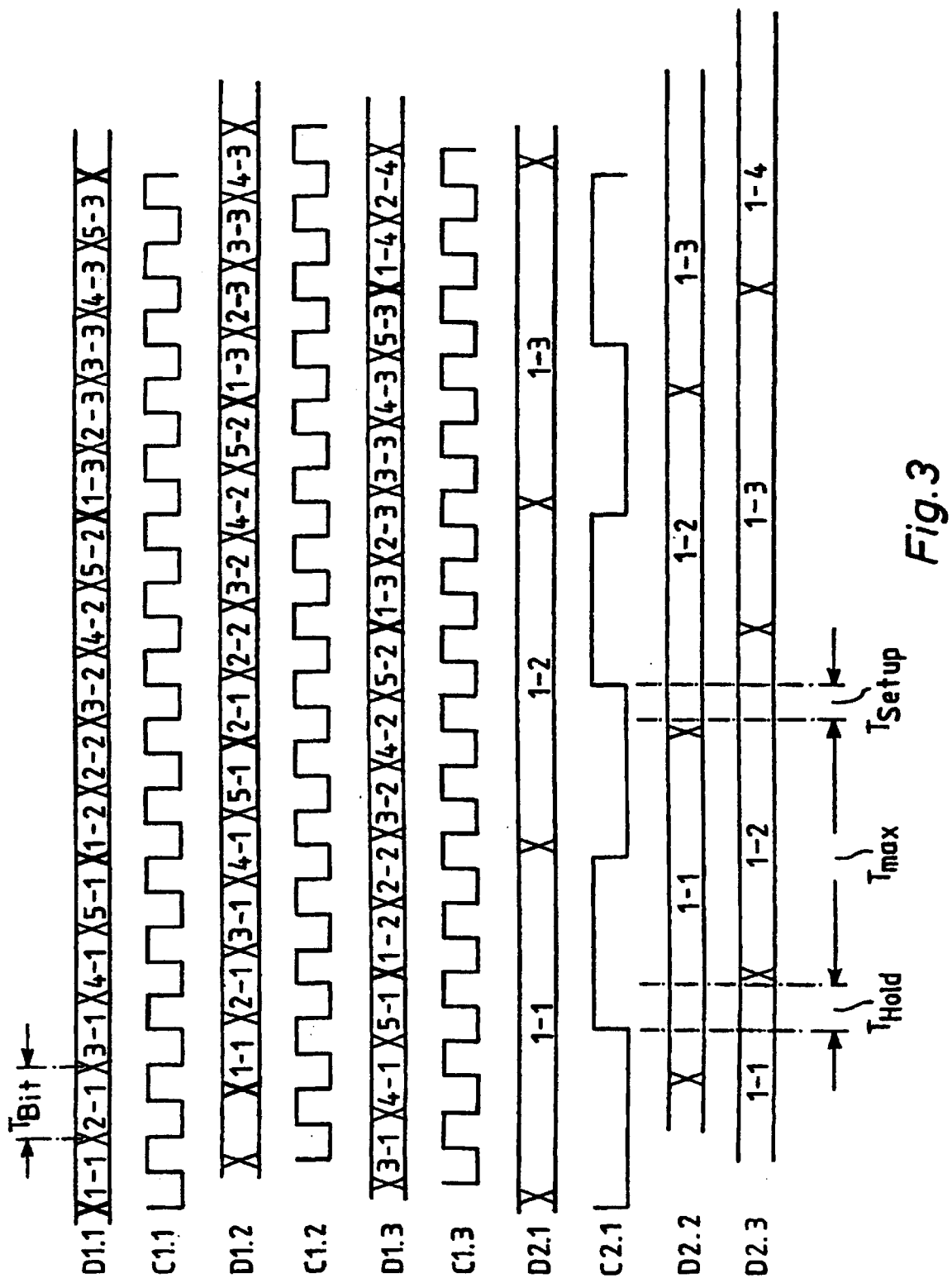
FIG. 3 is a signal diagram.

The regenerated data D1.n and the regenerated clock C1.n are respectively transmitted via data lines 5.n and via clock lines 6.n to a propagation delay control apparatus 7.n. Each of the propagation delay control apparatus 7.n has a demultiplexer and an alignment apparatus. The respective demultiplexer is used to divide the regenerated data D1.n and the regenerated clocks C1.n in a ratio 1:(x·m) where x=1, 2, . . . In the present case, the ratio is 1:5. This results in divided, regenerated data D2.n, whose bit length Tbit is lengthened by (x·m)-times in comparison to the supplied data D0.n, in the present case by five times. This is shown in FIG. 3. The lengthening of the data and of the clocks is used to create a time overlap between bits. The time overlap would not exist if the lengthening process were not carried out.

After the division of the regenerated data D1.n, the divided regenerated data D2.n are in the form of parallel data. The parallel data are then passed by means of the respective alignment apparatus and in a predetermined order to associated parallel data lines 8.n. To do this, a suitable pattern must be transmitted from time to time to the propagation delay control apparatus 7.n, so that it is possible to determine which data D2.n are passed to which of the parallel data lines 8.n. The word K28.5 is transmitted for this purpose in the "fiber channel" Standard. This word is used to reset the respective demultiplexers.

In order to convert the regenerated divided data D2.n back to a serial signal, these data are passed to a respective multiplexer 9.n. The multiplexers 9.n convert the divided regenerated data D2.n received via the parallel data lines 8.n to respective serial regenerated data D3.n. A synthesizer 10 is used for the conversion process, in order to form a serial clock signal C3.1 from one of the regenerated divided clock signals C2.1 which is supplied by a respective line 11 to the multiplexers 9.n. This serial clock signal C3.1 is in turn supplied to the multiplexers 9.n via a respective further line 12, so that a further serial clock signal C3*.1, which is delayed with respect to the serial regenerated data D3.n, can be formed from it.

If the intention is to process the regenerated divided data D2.n further in parallel form, then there is no need for the multiplexers 9.n or the synthesizer 10.

It is possible for a decoder to in each case be coupled between the propagation delay control apparatus 7.n and the multiplexers 9.n. The decoder is preferably matched to the word length of the data to be transmitted, for example a 5B/4B decoder can be provided for 5-bit words.

FIG. 3 shows a schematic illustration of a signal diagram of a part of the regenerated data D1.1, D1.2 and D1.3, as well as the associated regenerated clocks C1.1, C1.2 and C1.3. The figure also shows the regenerated divided data signals D2.1, D2.2 and D2.3, with the data for only one of the parallel lines 8.n being shown in each case. By way of example, the data line with the first bit has in each case been selected. In this case, k−1 denotes the $k^{th}$ bit in the $l^{th}$ word (k=1, . . . 5; l=1, 2, . . . ).

It can be seen from FIG. 3 that the bit length Tbit of the data D2.1, D2.2 and D2.3 corresponds to five times the bit length of the data D1.1, D1.2 and D1.3. The length of the regenerated, divided clock C2.1 also corresponds to five times the length of the regenerated clock C1.1, C1.2 and C1.3.

Figure 2:
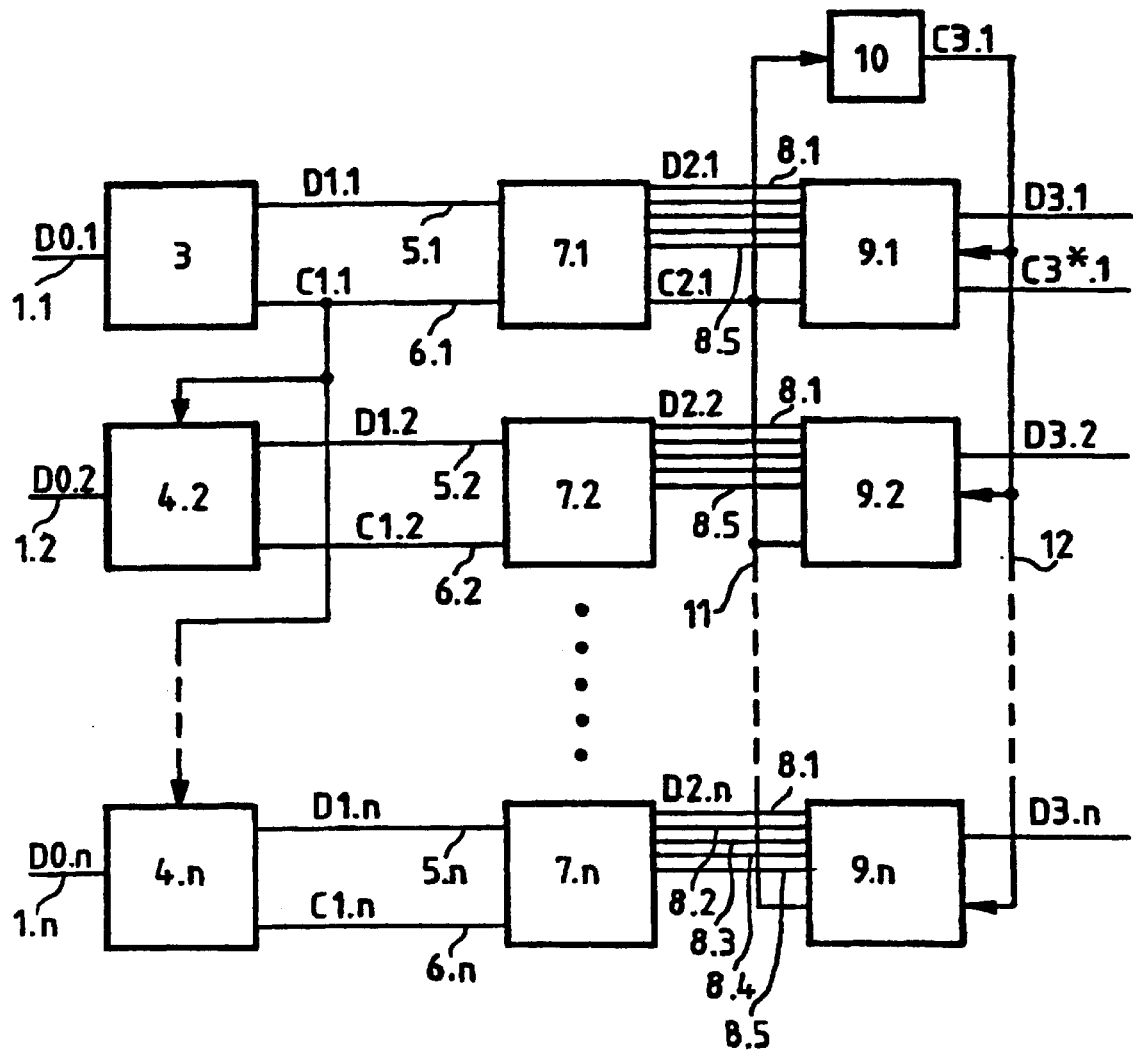
FIG. 2 is a further device for propagation delay compensation, with one clock regeneration apparatus and a number of phase regeneration apparatus.

The maximum propagation delay scatter Tmax which can be compensated for by means of the devices illustrated in FIGS. 1 and 2 is given, for an optimally centered clock (see FIG. 3) by:

$$T_{max} = n \cdot T_{bit} + T_{setup} - T_{hold} \quad (1)$$

In the worst case of clock selection, n is replaced by n/2 in equation (1).

I claim:

1. A device for compensating for propagation delay differences between n serial data streams transmitted via parallel optical lines, wherein the data transmitted via the n serial data streams are formed as m-bit words, the device comprising:

n regeneration apparatus each having an input connected to one of the parallel optical lines, a data output and a clock output, said input receiving a data stream from the respective optical line, each said regeneration apparatus being configured to regenerate data and a clock from the respective data stream;

propagation delay control apparatus each having a data input and a clock input respectively connected to said data output and said clock output of said regeneration apparatus, said data input receiving the regenerated data and said clock input receiving the regenerated clock; and each of said propagation delay control apparatus having a demultiplexer for dividing the regenerated data and the regenerated clocks in a ratio 1:(x·m) and an alignment apparatus for distributing the divided, regenerated data between in each case x·m parallel data outputs of said propagation delay control apparatus, wherein a divided, regenerated clock that is synchronized to the divided, regenerated data is emitted at a clock output of a least one of said propagation delay control apparatus.

2. The device according to claim 1, wherein each of said n regeneration apparatus is a clock regeneration apparatus.

3. The device according to claim 1, wherein one of said n regeneration apparatus is a clock regeneration apparatus, and a number n−1 of said regeneration apparatus are each formed as a phase regeneration apparatus, and said clock output of said clock regeneration apparatus is connected to a respective clock input of said n−1 phase regeneration apparatus.

4. The device according to claim 1, which further comprises:

n multiplexer apparatus for converting the divided, regenerated data to a respective serial, regenerated data stream, said n multiplexer apparatus having x·m parallel data inputs respectively connected to said x·m parallel data outputs of said propagation delay control apparatus; and a synthesizer having an input connected to a respective clock input of said multiplexer apparatus and to said clock output of said at least one propagation delay control apparatus, and said synthesizer having an output connected to a respective further clock input of said multiplexer apparatus.

5. The device according to claim 4, wherein at least one of said n multiplexer apparatus has a serial clock output for outputting a further serial clock signal matched to said serial regenerated data stream and delayed with respect to a serial clock signal generated by said synthesizer.

6. The device according to claim 4, which comprises a decoder apparatus each coupled between a respective said propagation delay control apparatus and said multiplexer apparatus.

7. A method of compensating for propagation delay differences, which comprises:

receiving data with n regeneration apparatus arriving in n serial data streams via respective parallel optical lines, wherein data transmitted via the n serial data streams are in the form of in-bit words;

regenerating the data and a clock for the data received in each of the respective n regeneration apparatus;

transmitting the regenerated data and the regenerated clock to a respective propagation delay control apparatus;

dividing the regenerated data and the regenerated clock in a ratio 1:(x·m) with a respective demultiplexer;

emitting a divided regenerated clock that is synchronized to the divided regenerated data at a clock output of the respective propagation delay control apparatus; and distributing the divided regenerated data between parallel data outputs of the respective propagation delay control apparatus.

8. A method of compensating for propagation delay differences, which comprises:

receiving data with the device according to claim 1 in n serial data streams formed of m-bit words via respective parallel optical lines;

regenerating the data and a clock for the data received in each of the respective n regeneration apparatus;

transmitting the regenerated data and the regenerated clock to a respective propagation delay control apparatus;

dividing the regenerated data and the regenerated clock in a ratio 1:(x·m) with a respective demultiplexer; and distributing the divided regenerated data between parallel data outputs of the respective propagation delay control apparatus.

\* \* \* \* \*